US010677342B2

(12) United States Patent
Ramirez Ortiz et al.

(10) Patent No.: US 10,677,342 B2
(45) Date of Patent: Jun. 9, 2020

(54) GEAR HOUSING INCLUDING SNAP-FIT CONNECTION BETWEEN HOUSING COVER AND GEAR SHAFT

(71) Applicants: Robert Bosch Mexico Sistemas Automotrices S.A. de C.V., Toluca (MX); Robert Bosch GmbH, Stuttgart (DE)

(72) Inventors: Luis Angel Ramirez Ortiz, Toluca (MX); Alex Martin, Karlsruhe (DE); Pablo Daniel Molina Cardozo, Toluca (MX)

(73) Assignees: Robert Bosch Mexico Sistemas Automotrices S.A. de C.V., Toluca (MX); Robert Bosch GmbH, Stuttgart (DE)

( * ) Notice: Subject to any disclaimer, the term of this patent is extended or adjusted under 35 U.S.C. 154(b) by 4 days.

(21) Appl. No.: 16/030,302

(22) Filed: Jul. 9, 2018

(65) Prior Publication Data

US 2020/0011409 A1      Jan. 9, 2020

(51) Int. Cl.
*F16H 57/031* (2012.01)
*F16B 21/06* (2006.01)
*F16H 57/02* (2012.01)

(52) U.S. Cl.
CPC ........... *F16H 57/031* (2013.01); *F16B 21/06* (2013.01); *F16H 2057/02034* (2013.01)

(58) Field of Classification Search
CPC ........ F16B 21/06; F16B 21/07; F16B 21/071; F16B 21/073; F16B 21/08; F16B 21/082; F16B 21/084; F16B 21/086; F16B 21/088; F16H 57/031; F16H 57/02; F16H 57/039; F16H 57/023; F16H 2057/02034; F16H 2057/0235; B60N 2/0232; B60N 2002/024

See application file for complete search history.

(56) References Cited

U.S. PATENT DOCUMENTS

| 5,297,322 A * | 3/1994 | Kraus | F16B 21/073 24/297 |
|---|---|---|---|
| 5,882,047 A | 3/1999 | Ostrander et al. | |
| 6,014,915 A | 1/2000 | Evans | |

(Continued)

FOREIGN PATENT DOCUMENTS

| EP | 2037153 A2 * | 3/2009 | ........... F16H 57/031 |
|---|---|---|---|
| NL | 9200027 A * | 8/1993 | ........... G09F 3/0317 |

OTHER PUBLICATIONS

Machine Translation of EP 2037153, obtained Oct. 14, 2019.*

*Primary Examiner* — Richard W Ridley
*Assistant Examiner* — Brian J McGovern
(74) *Attorney, Agent, or Firm* — Kelly McGlashen; Maginot, Moore & Beck, LLP (57) ABSTRACT

An actuator housing is configured to receive an electric motor and a gear set that modifies the output of the motor. The actuator housing includes a gear housing that supports the gear set for rotation. The gear set includes a worm gear that is driven by the motor and has an opening that is concentric with a rotational axis of the gear. The gear housing includes a container and a cover that closes an open end of the container. The container houses the gear and defines a hollow gear shaft that extends through the gear opening. The cover is secured to the open end of the gear housing via a snap-fit mechanical connection between the cover and the gear shaft.

20 Claims, 9 Drawing Sheets

(56) References Cited

U.S. PATENT DOCUMENTS

| | | | |
|---|---|---|---|
| 6,463,829 B2 | 10/2002 | Torii et al. | |
| 7,945,992 B2 | 5/2011 | Parisi et al. | |
| 8,720,016 B2 | 5/2014 | Beaulieu | |
| 9,188,214 B2 * | 11/2015 | Suto | F16H 1/16 |
| 2006/0025017 A1 | 2/2006 | Sikora et al. | |
| 2011/0175465 A1 * | 7/2011 | Huck | F16H 57/021 |
| | | | 310/43 |
| 2015/0233461 A1 * | 8/2015 | Weigold | F16H 57/0031 |
| | | | 74/425 |
| 2016/0169326 A1 * | 6/2016 | Fujii | F16H 1/08 |
| | | | 74/414 |
| 2017/0259708 A1 * | 9/2017 | Ta | B60N 2/0232 |
| 2018/0222348 A1 * | 8/2018 | Romer | B60N 2/0232 |

* cited by examiner

FIG. 14

GEAR HOUSING INCLUDING SNAP-FIT CONNECTION BETWEEN HOUSING COVER AND GEAR SHAFT

BACKGROUND

Actuators such as those used to adjust seat position within a vehicle may include an electric motor and a gear set disposed between the drive motor and seat that transmits the output of the motor to the vehicle seat. The gear set may be disposed in a housing having separable components such as a container and a cover that are assembled together after the gear set has been installed therein. The housing components are maintained in the assembled configuration using mechanical fasteners, adhesives, welding or other fastening techniques. Use of snap-fit mechanical fasteners can be advantageous since the snap fit fastener components may be formed integrally with the corresponding housing components in an injection molding process and since housing assembly is simple and can be performed without tools. However, in some embodiments, the snap fit fastener components may protrude from edge portions of the housing container and cover. During handling of the gear housing components, for example during assembly of the gear set and/or during assembly of the gear housing components, the snap fit fastener components may be loaded and can break, which results in reduced manufacturability.

In some actuators, the gear set includes a worm gear that is driven by a pinion mounted on the motor output shaft. In use, the worm gear may generate forces on the housing in a direction that tends to separate the cover from the container, for example in a direction parallel to the rotational axis of the worm gear. In some embodiments, the generated forces are sufficient to require five or six fasteners between the lid and the container in order for the cover to be retained on the container. The large number of fasteners increases the likelihood of damage during handling, and the effort of measurement during production and quality assurance is more difficult and expensive than for housings having fewer such fasteners. In addition, the worm gear is supported on and rotates about a gear shaft that is spaced apart from the gear housing sidewalls. The distance between the location of force application at the gear shaft and the fasteners at the gear housing sidewalls may result in an undesirable and/or excessive deflection of the cover.

A need exists for an actuator housing that has fasteners that securely join the housing components, are unlikely to be damaged during handling and assembly, and minimize the number of fasteners that are required to maintain the housing components in an assembled configuration without undesirable deflection of the housing components.

SUMMARY

In some aspects, a fastener is configured to connect a housing cover to an open end of a housing container. The housing container includes a base, a sidewall that surrounds a periphery of the base and a hollow shaft. The shaft extends perpendicularly from, and is fixed to, the base and is surrounded by the sidewall. The fastener includes a retainer and a receptacle. The retainer includes a post that protrudes from an inner surface of the housing cover and a latch portion disposed on a free end of the post. The latch portion has a diameter that is larger than a diameter of the post free end. The receptacle is disposed in the shaft, and has the shape of a hollow, truncated cone. The receptacle includes a receptacle first end that is fixed to an inner surface of the shaft, a receptacle second end that is spaced apart from the receptacle first end, and slots that extend between the receptacle first end and the receptacle second end and separate the receptacle into elastic fingers. When the retainer is assembled with the receptacle, the post is disposed in the receptacle and extends through the receptacle second end so that a) the latch portion is disposed outside the receptacle, and b) the retainer is retained in connection with the receptacle via engagement of the latch portion with the receptacle second end.

In some embodiments, the retainer forms a snap-fit connection to the receptacle.

In some embodiments, the diameter of the latch portion is greater than a diameter of the receptacle second end.

In some embodiments, the latch portion has an outer dimension that is greater than an inner diameter of the receptacle second end. In addition, the receptacle is configured to expand to an expanded configuration in order to allow passage of the latch portion through the receptacle second end during assembly of the housing cover with the housing container, and to elastically contract or return to a less expanded configuration after the latch portion has passed through the receptacle second end.

In some embodiments, the post includes a fixed end that is fixed to the inner surface of the housing cover, and a diameter of the fixed end is greater than a diameter of the free end.

In some embodiments, the post includes a fixed end that is fixed to the inner surface of the housing cover, and the post includes grooves that extend from the fixed end to the free end.

In some embodiments, an elastic finger is received within each groove.

In some embodiments, the receptacle is disposed inside the shaft such that the receptacle first end and the receptacle second end are surrounded by the shaft.

In some aspects, an actuator housing is provided for enclosing an electric motor and a gear set that modifies the output of the motor. The gear set includes a gear that has an opening that is concentric with a rotational axis of the gear. The actuator housing includes a gear housing that houses the gear and defines a hollow gear shaft (e.g., the gear shaft forms a part of the gear housing) that extends through the opening, and a cover that closes an open end of the gear housing. The cover is secured to the open end of the gear housing via a mechanical connection between the cover and the gear shaft.

In some embodiments, the mechanical connection is achieved using a snap-fit fastener.

In some embodiments, the mechanical connection is achieved using a fastener, and the fastener includes a retainer and a receptacle. The retainer includes a post that protrudes from an inner surface of the cover and a latch portion disposed on a free end of the post. The latch portion has a diameter that is larger than a diameter of the post free end. The receptacle is disposed in the gear shaft. The receptacle has the shape of a truncated, hollow cone, and includes a receptacle first end that is fixed to an inner surface of the gear shaft, a receptacle second end that is spaced apart from the receptacle first end, and slots that extend between the receptacle first end and the receptacle second end and separate the receptacle into elastic fingers. When the retainer is assembled with the receptacle, the post is disposed in the receptacle and extends through the receptacle second end so that the latch portion is disposed outside the receptacle and the retainer is retained in connection with the receptacle via engagement of the latch portion with the receptacle second end.

In some embodiments, the retainer forms a snap-fit connection to the receptacle.

In some embodiments, the diameter of the latch portion is greater than a diameter of the receptacle second end.

In some embodiments, the latch portion has an outer dimension that is greater than an inner diameter of the receptacle second end, and the receptacle is configured to expand to an expanded configuration in order to allow passage of the latch portion through the receptacle second end during assembly of the housing cover with the housing container, and to elastically contract after the latch portion has passed through the receptacle second end.

In some embodiments, the post includes a fixed end that is fixed to the inner surface of the cover, and a diameter of the fixed end is greater than a diameter of the free end.

In some embodiments, the post includes a fixed end that is fixed to the inner surface of the cover, and the post includes grooves that extend from the fixed end to the free end.

In some embodiments, an elastic finger is received within each groove.

In some embodiments, the receptacle is disposed inside the gear shaft such that the receptacle first end and the receptacle second end are surrounded by the gear shaft.

In some embodiments, the retainer is disposed in a recess formed in the cover inner surface.

In some aspects, a housing for an electro-mechanical device includes a container and a cover that closes an open end of the container. The container receives and supports the electro-mechanical device, and includes a base and sidewall that protrudes from the base. A free edge of the sidewall defines the open end of the container. The cover is secured to the open end of the container via a mechanical connector that includes a receptacle and a retainer that forms a snap-fit engagement with the receptacle, The retainer is formed integrally with the cover and is recessed relative to a surface of the cover and the receptacle is formed integrally with the container and is recessed relative to a surface of the container, or the retainer is formed integrally with container and is recessed relative to a surface of the container and the receptacle is formed integrally with the cover and is recessed relative to a surface of the cover.

In some aspects, a housing is used to house a gear set that is driven by the motor. The housing includes a housing container and a housing cover that closes an open end of the housing container. The gear set includes a worm gear that is driven by the motor and that is supported for rotation within the housing by a hollow gear shaft that protrudes integrally from a base of the housing container. The housing includes a fastener that secures the housing cover to the housing container. More particularly, the fastener secures the cover to the open end of the container via a mechanical connection between the cover and the gear shaft.

In some embodiments, the fastener is a snap-fit fastener that includes a retainer that is provided on an inner surface of the cover and a receptacle that is provided in the gear shaft. The receptacle receives the retainer in a snap fit manner, and the retainer includes a latch that retains the retainer in an engaged configuration with the receptacle upon snap-fit engagement. Since the receptacle is disposed inside the gear shaft, the receptacle is protected from damage during handling. Similarly, since the retainer is surrounded by an inner wall portion of the cover, the retainer is also protected from damage during handling.

Since the fastener is disposed on the rotational axis of the worm gear, the lever arm of the moment due to the axial force of the worm gear on the cover is minimized, whereby a deflection of the cover relative to the container is also minimized, and the number of fasteners provided along the container sidewall can be reduced.

DETAILED DESCRIPTION

Referring to FIGS. 1-4, an actuator such as those used to adjust seat position within a vehicle may include an electric drive motor (not shown), and a gear set 9 (only a portion of the gear set 9 is shown) that is disposed between the drive motor and vehicle seat. The gear set 9 transmits the output of the drive motor to the vehicle seat. The drive motor and the gear set 9 are housed in an actuator housing 1. The actuator housing 1 includes a gear housing 8 that receives the gear set 9 and supports the gear set 9 for rotation. The gear housing 8 has an irregular, curved shape. For example, in the illustrated embodiment, the gear housing 8 has the appearance of a pair of overlapping circles when viewed in top plan view (e.g., in a direction parallel to the rotational axis 12), in which one circle of the pair of circles is smaller than the other circle. The actuator housing 1 also includes a drive shaft housing 4 that receives and supports the output shaft (not shown) of the drive motor. The drive shaft housing 4 may be formed integrally with the gear housing 8 and intersects the gear housing 8 at one side of the smaller circle of the pair of circles. The drive shaft housing 4 is oriented so that the drive shaft of the drive motor will extend in a direction transverse to the rotational axis 12. The drive motor may include a drive motor housing 2 that is formed separately from the actuator housing 1, and is attached thereto during assembly of the actuator. The drive motor housing 2 is joined to the drive shaft housing 4 at a location that is spaced apart from the gear housing 8.

The gear housing 8 is formed of separable components such as a container 20 and a cover 40 that are assembled together after the gear set 9 has been installed therein. The housing components 20, 40 are maintained in the assembled configuration using snap fit mechanical fasteners, including a central snap fit fastener 60 and a pair of peripheral snap fit fasteners 100, as discussed in detail below.

The gear set 9 includes a worm gear 10 that is driven to rotate about a rotational axis 12 by a pinion gear (not shown) provided on the drive motor output shaft. The worm gear 10 is a spur gear having external teeth 11 that are engaged by the pinion gear. The gear set 9 includes a secondary spur gear 14 that is formed integrally with, and protrudes from a side face of, the worm gear 10 so as to rotate about the rotational axis 12 in concert with the worm gear 10. The secondary spur gear 14 has a smaller diameter than the worm gear 10, and mechanically connects the worm gear 10 to other gears (not shown) of the gear set 9. The worm gear 10 and the secondary spur gear 14 have an axial opening 13 that is concentric with the rotational axis 12 of the worm gear 10, and are supported within the gear housing 8 by a gear shaft 25 that extends through the axial opening 13.

Figure 1:
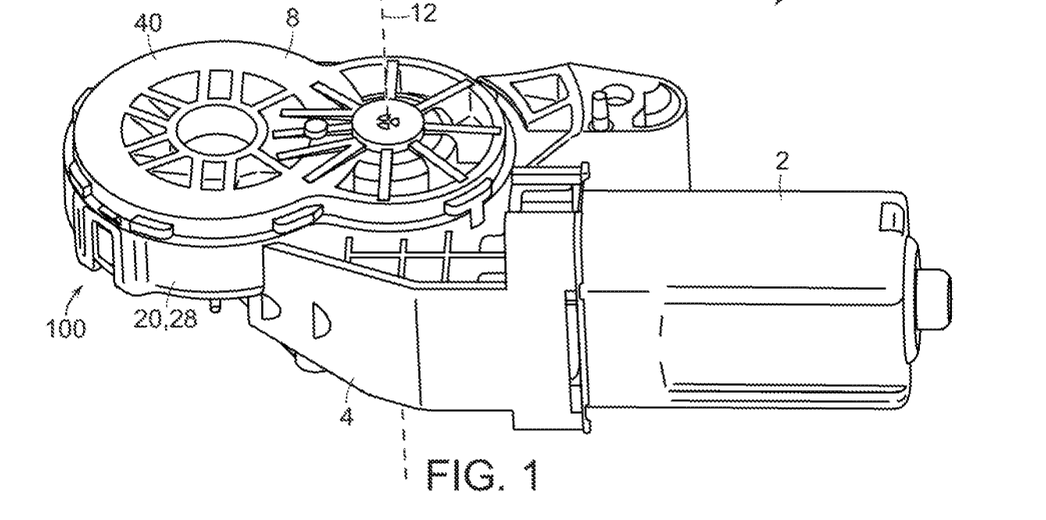
FIG. 1 is a side perspective view of an actuator housing for a seat position actuator, the actuator housing including a gear housing and a drive motor housing.
Figure 2:
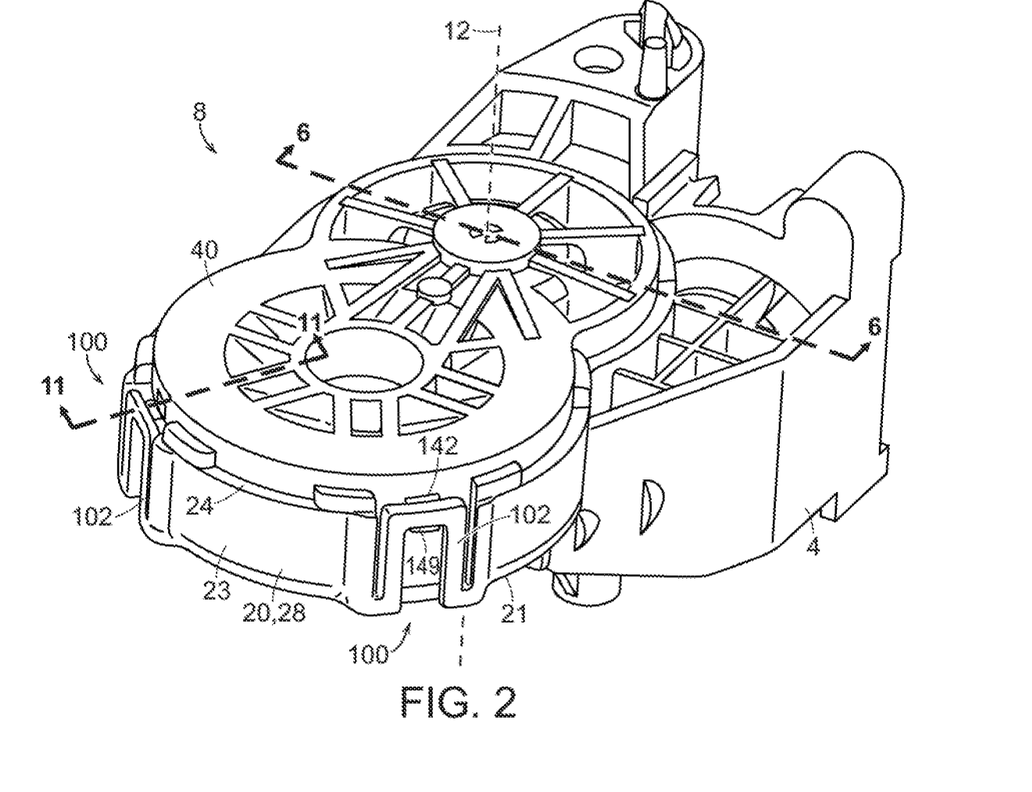
FIG. 2 is a perspective view of the gear housing of FIG. 1.
Figure 3:
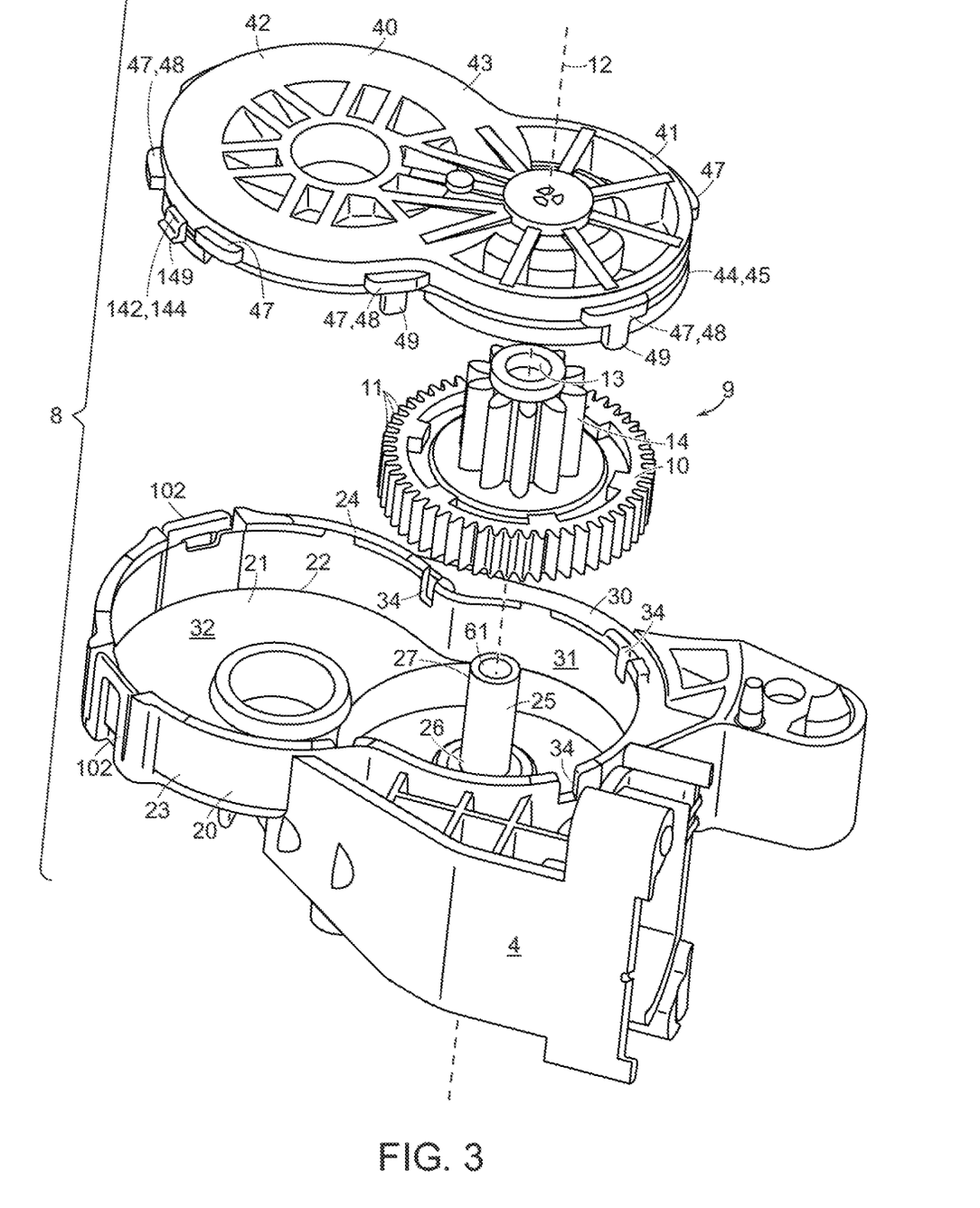
FIG. 3 is an exploded perspective view of the gear housing of FIG. 1 as seen from above and illustrating a portion of a gear set.
Figure 4:
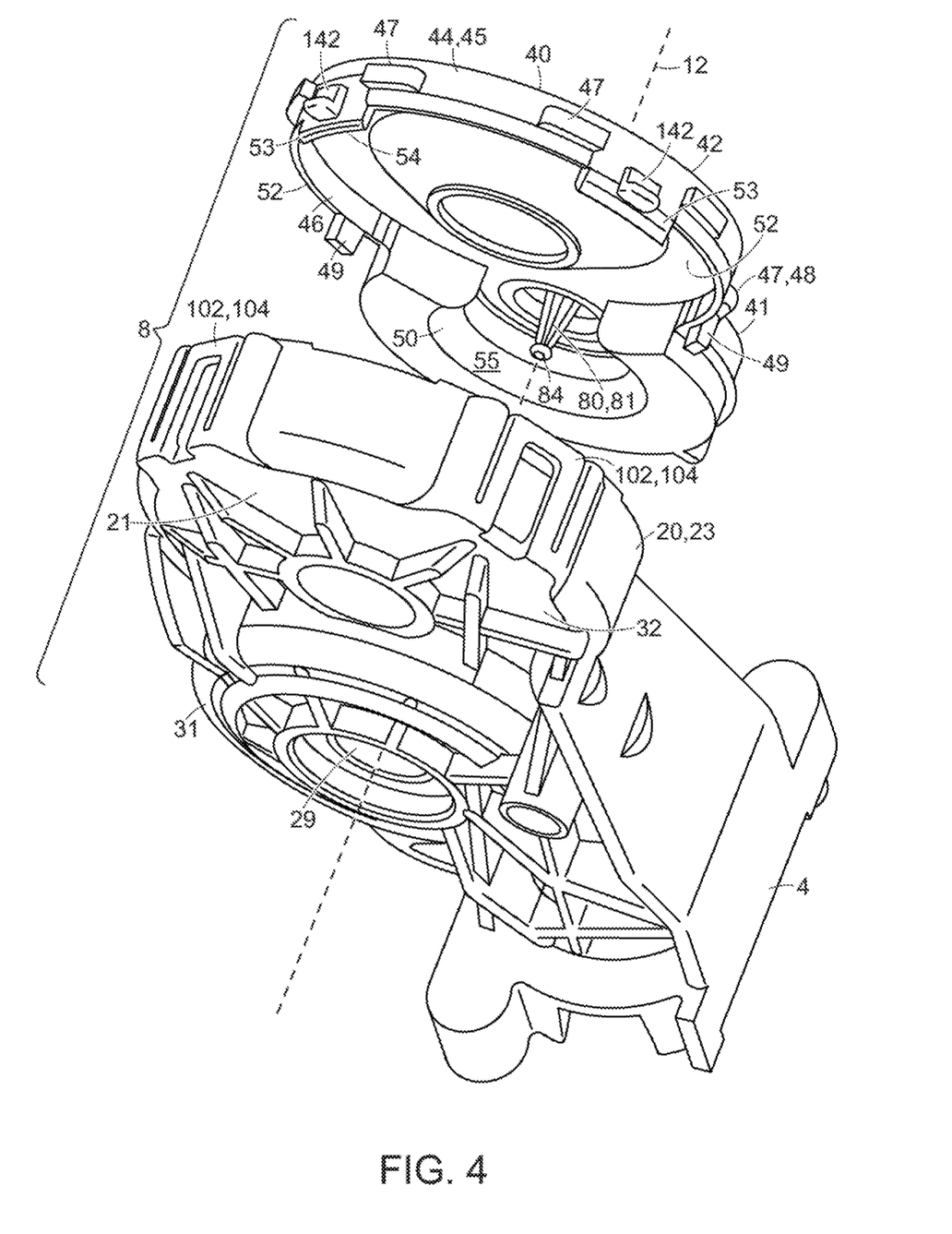
FIG. 4 is an exploded perspective view of the gear housing of FIG. 1 as seen from below with the portion of the gear set omitted for clarity.

The container 20 includes a base 21 that forms the bottom of the container 20 and a sidewall 23 that surrounds a peripheral edge 22 of the base 21 and forms the sides of the container 20. The base peripheral edge 22 has an irregular curved shape having the appearance of a pair of overlapping circles when viewed in top plan view. Thus, the base 21 includes a first circular region 31 corresponding to the smaller circle of the pair of overlapping circles, and a second circular region 32 corresponding to the larger circle of the pair of overlapping circles. The sidewall 23 protrudes from the base peripheral edge 22 in a direction parallel to the rotational axis 12, and includes a free edge 24. The sidewall free edge 24 is spaced apart from, and is parallel to, the base 21, and the distance between the base 21 and the sidewall free edge 24 corresponds to a height h1 of the sidewall 23. The sidewall free edge 24 defines the open end 30 of the container 20, and supports the cover 40, as discussed further below.

The container 20 includes a hollow gear shat 25 that is formed integrally with the container 20 and protrudes from the base 21 in a direction parallel to the rotational axis 12 and toward the cover 40. The gear shaft 25 is coaxial with the r d is centered on the smaller, first circular region 31 of the base 21. The gear shaft 25 includes a fixed end 26 that adjoins the base 21 and a free end 27 that is opposed to, and spaced apart from, the fixed end 26. The height h2 of the gear shaft 25 is greater than the height h1 of the sidewall 23, where the term "height" refers to the dimension in a direction parallel to the rotational axis 12 (e.g., the "axial direction"). The gear shaft 25 extends through the gear axial opening 13 and supports the worm gear 10 and secondary spur gear 14 for rotation within the gear housing 8.

The cover 40 is configured to close the open end 30 of the container 20, and thus has the appearance of a pair of overlapping circles when viewed in top plan view. In addition, the cover 40 includes a first circular region 41 corresponding to the smaller circle of the pair of overlapping circles, and a second circular region 42 corresponding to the larger circle of the pair of overlapping circles. The overlapping first and second circular regions 41, 42 define a body 43 of the cover 40. The cover body 43 is surrounded by a rim 44 that protrudes from the cover body 43 in an axial direction, e.g. toward the container 20.

The rim 44 has an outward-facing surface 45 and an inward-facing surface 46 that is radially spaced apart from the outward-facing surface 45. Tabs 47 protrude outward from the outward-facing surface 45. When the cover 40 is assembled with the container 20, the cover 40, including the outward-facing surface 45, is partially received within the sidewall 23, and the tabs 47 serve as stops that limit the extent to which the cover 40 can be inserted into the container 20. The tabs 47 include a transverse portion 48 that abut the sidewall free edge 24. A subset of the tabs 47 also include an axial portion 49 that extends in a direction perpendicular to the transverse portion 48 and intersects the transverse portion 48 so that the tab 47 has a "T" shape when the cover is viewed in a direction transverse to the rotational axis 12. The tab axial portion 49 is received within a corresponding slot 34 provided in the sidewall free edge 24.

Within the cover first circular region 41, the cover 40 includes an inner wall 50 that is parallel to the rim 44 and disposed between the rotational axis 12 and the rim 44 (FIG. 4). The inner wall 50 defines a cylindrical vacancy 55 in the cover 40 that is centered on the rotational axis 12. The inner wall 50 has a diameter that is sufficient to receive the gear shaft free end 27 and the secondary spur gear 14 in a clearance fit.

Within the cover second circular region 42, the rim 44 includes a pair of circumferentially-spaced extension tabs 53 that protrude from a free edge 52 of the rim 44 in a direction parallel to the rotational axis 12. The extension tabs 53 are portions of the rim 44 that extend axially beyond the rim free edge 52, and each extension tab 53 supports a portion of a peripheral snap fit fastener 100, as discussed further below.

When the cover 40 is assembled with the container 20, the first circular region 41 of the cover 40 is aligned with the first circular region 31 of the container 20, and the second circular region 42 of the cover 40 is aligned with the second circular region 32 of the container 20. In addition, the tab transverse portions 48 abut the sidewall free edge 24, and the tab axial portions 49 are disposed in the slots 34. The cover 40 is securely and reliably retained in this assembled configuration with the container 20 via the mechanical connection provided by the central snap fit fastener 60 and the peripheral snap fit fasteners 100.

Figure 5:
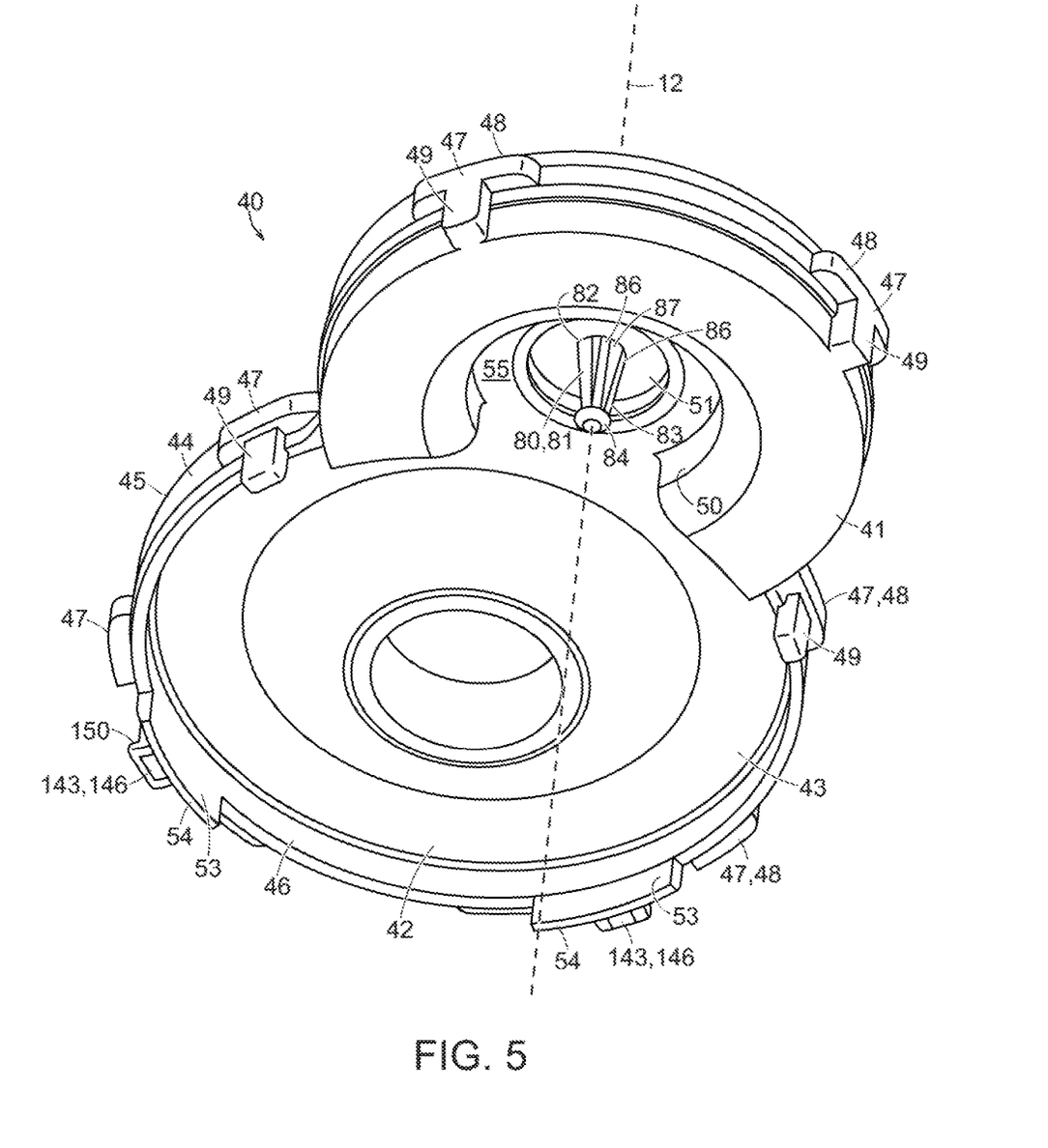
FIG. 5 is a perspective view of an inward facing surface of the cover of the gear housing.
Figure 6:
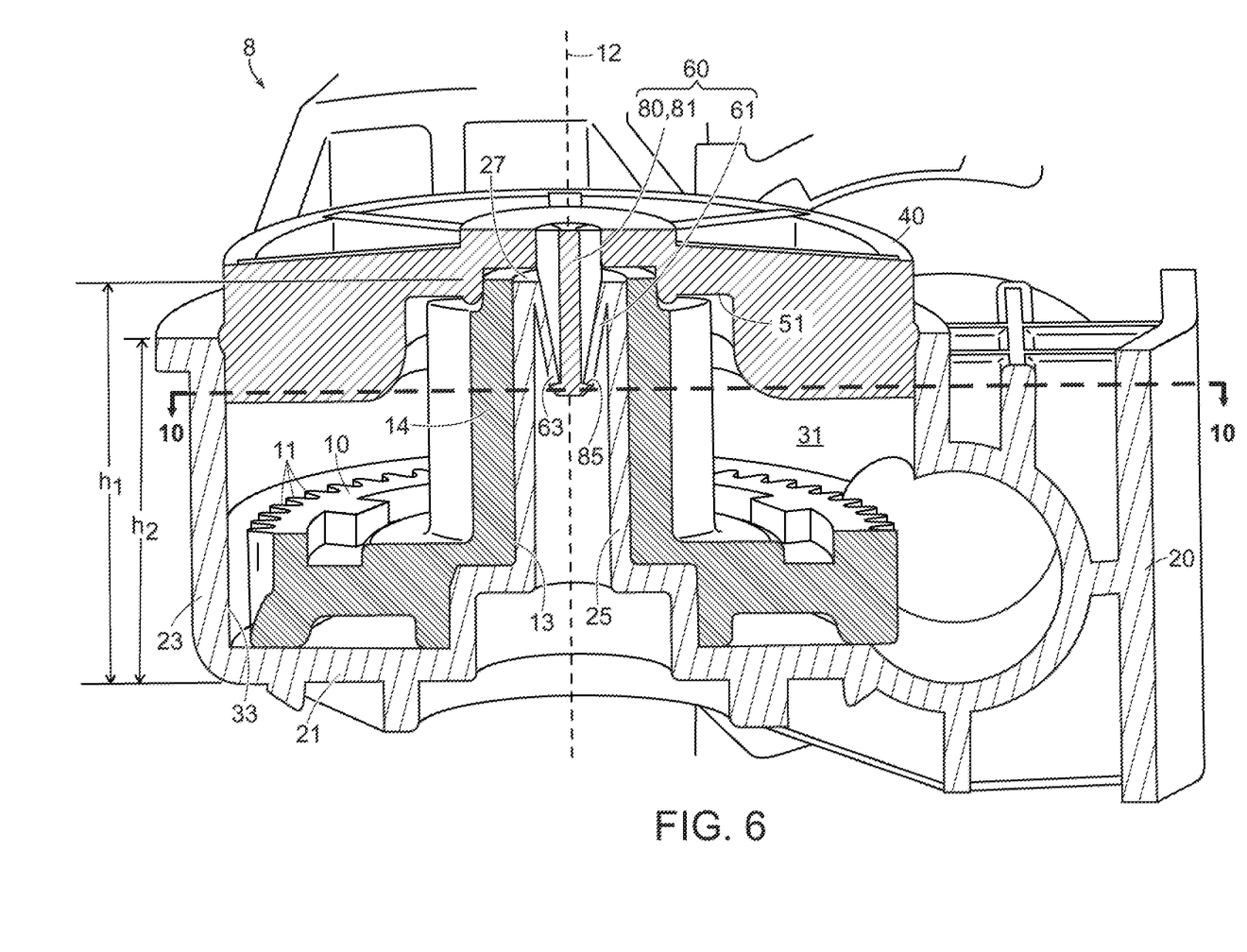
FIG. 6 is a perspective cross sectional view of the gear housing as seen along line 6-6 of FIG. 2.
Figure 7:
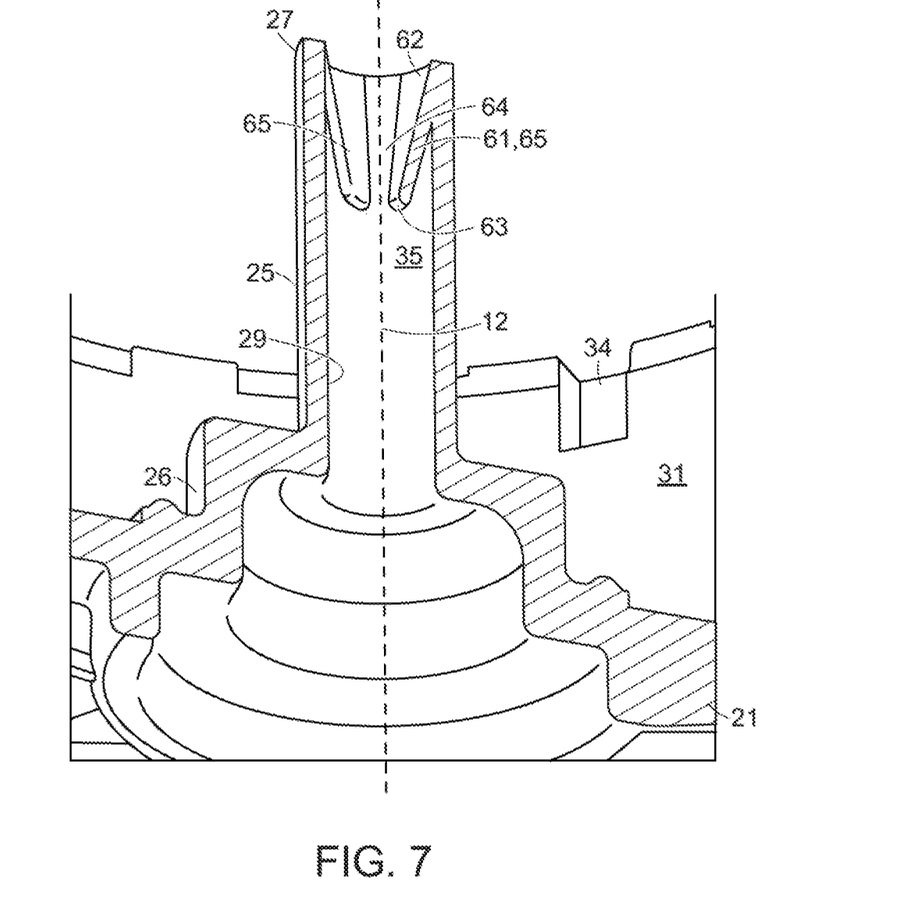
FIG. 7 is a perspective cross sectional view of a portion of the container of the gear housing.

Referring to FIGS. 5-7, the central snap-fit fastener 60 secures the cover 40 to the container 20 at a location that is spaced apart from the sidewall 23 and coincides with the axis of rotation 12 of the worm gear 10. The central snap-fit fastener 60 includes a receptacle 61 that is disposed in the hollow interior space of the gear shaft 25, and a retainer 80 that protrudes from the cover body inner surface 51 and forms a snap-fit engagement with the receptacle 61.

The receptacle 61 is disposed within the hollow interior of the gear shaft 25. In particular, the receptacle is formed integrally with an inner surface 29 of the gear shaft 25, and has the shape of a truncated hollow cone that is centered on the rotational axis 12. The receptacle 61 includes a receptacle first end 62 that is fixed to an inner surface of the gear shaft 25 at a location that coincides with the gear shaft free end 27. The receptacle 61 also includes a receptacle second end 63 that is disposed between the gear shaft fixed and free ends 26, 27. The receptacle second end 63 is spaced apart from, and surrounded by, the gear shaft inner surface 29.

Since the receptacle 61 is disposed within the recess 35 provided by the hollow interior of the gear shaft 25, the gear shaft 25 serves to protect the receptacle 61 during handling and assembly of the actuator housing 1.

In addition, an inner diameter of the receptacle 61 is greatest at the receptacle first end 62 (e.g., at the free, open end 27 of the gear shaft), and least at the receptacle second end 63. The receptacle 61 includes slots 64 that extend between the receptacle first end 62 and the receptacle second end 63. The slots 64 separate the receptacle 61 into elastic fingers 65. In the illustrated embodiment, the receptacle 61 has three equidistantly spaced slots 64 and three fingers 65, but the receptacle 61 may have a fewer or greater number of slots 64 as required by the specific application. Moreover, the spacing of the slots 64 may also be non-uniform as required by specific application.

Figures 8, 9:
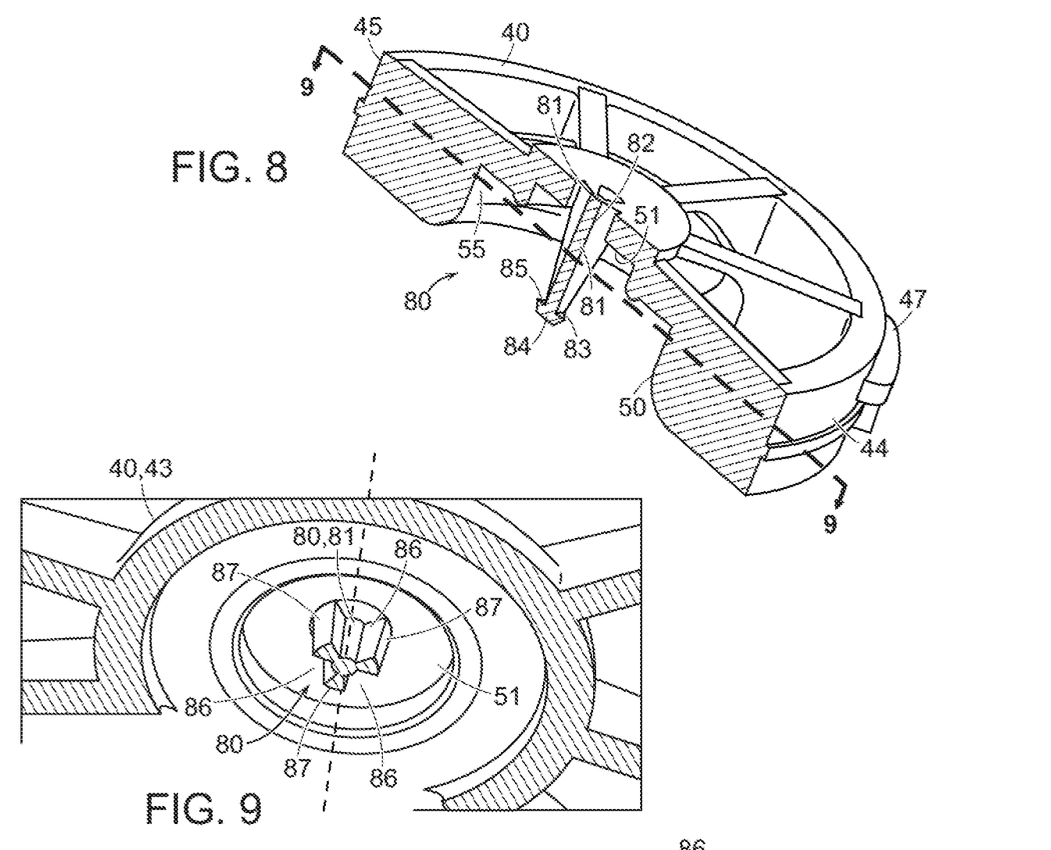
FIG. 8 is a perspective cross sectional view of a portion of the cover of the gear housing as seen along line 6-6 of FIG. 2.
FIG. 9 is a perspective cross sectional view of a portion of the cover of the gear housing as seen along line 9-9 of FIG. 8.
Figure 10:
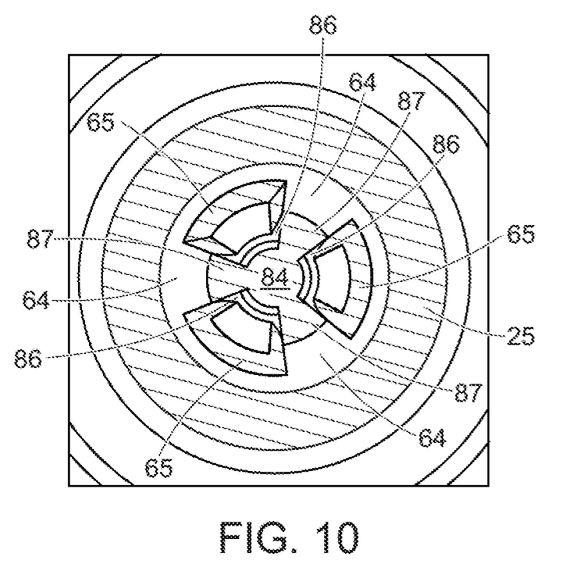
FIG. 10 is a perspective cross sectional view of a portion of the cover of the gear housing as seen along line 10-10 of FIG. 6.

Referring also to FIGS. 8-10, the retainer 80 includes a post 81 that protrudes from an inner surface 51 of the cover body 43. In particular, the post 81 has a fixed end 82 that is integral with the inner surface 51 within first circular region 41 so as to be coaxial with the rotational axis 12, and so as to be surrounded by, and spaced apart from, the cover inner wall 50. Thus, the retainer 80 is disposed in a recess 55 defined by the cover inner wall 50, and, among other things, the cover inner wall 50 serves to protect the post 81 during handling and assembly of the actuator housing 1.

In addition, the post 81 includes a free end 83 that is opposed to the fixed end 82, and a latch portion 84 that is disposed on the post free end 83. The post fixed end 82 has a larger diameter than a diameter of the post free end 83, whereby the post 81 is tapered in the axial direction. The latch portion 84 has a diameter that is larger than the diameter of the post free end 83 and the inner diameter of the receptacle second end 63. In addition, the latch portion 84 has a diameter that is smaller than the diameter of the post fixed end 82. Due to the difference in diameters, a shoulder 85 is formed at the transition between the post free end 83 and the latch portion 84. The shoulder 85 faces, and is parallel to, the cover body inner surface 51. The post 81 also includes axial grooves 86 that extend between the post fixed end 82 and the latch portion 84, and lands 87 are defined between the grooves 86.

During assembly of the cover 40 with the container 20, the post 81 is inserted into the gear shaft free end 27 and thus also the receptacle first end 62. Since the latch portion 84 has a diameter that is larger than that of the receptacle second end 63, as the post 81 advances axially within the receptacle 61, the latch portion 84 urges the receptacle fingers 65 to deflect radially away from the rotational axis 12, whereby the receptacle second end 63 radially expands. When the cover 40 is fully assembled with the container 20 such that the tab transverse portions 48 abut the sidewall free edge 24, the post 81 is disposed in the receptacle 61 and extends through the receptacle second end 63 so that the latch portion 84 is disposed outside the receptacle 61. In this position, the receptacle fingers 65 elastically return to less expanded configuration closer to the rotational axis 12, and reside within a corresponding groove 86 of the post 81, while the slots 64 receive a corresponding land of the post 81. The retainer 80 is retained in connection with the receptacle 61 via engagement of the latch portion shoulder 85 with the receptacle second end 63, which prevents withdrawal of the post 81 from the receptacle 61.

Referring to FIGS. 2-4 and 11-14, the peripheral snap fit fasteners 100 secure the rim 44 of the cover 40 to the sidewall 23 of the container 20. In the illustrated embodiment, the actuator housing 1 includes two peripheral snap-fit fasteners 100 that are provided within the second circular region 32. The snap-fit fasteners 100 are spaced apart from each other and from first circular region 31 along a circumference of the sidewall 23. Each peripheral snap-fit fastener 100 includes a clip 102 that is disposed on an outer surface 28 of the sidewall 23, a lug 142 that protrudes from the cover 40 and engages the clip 102 and bumpers 180 that define a recess 182 within the container sidewall 23 that receives the clip 102 and lug 142 therein.

Figure 13:
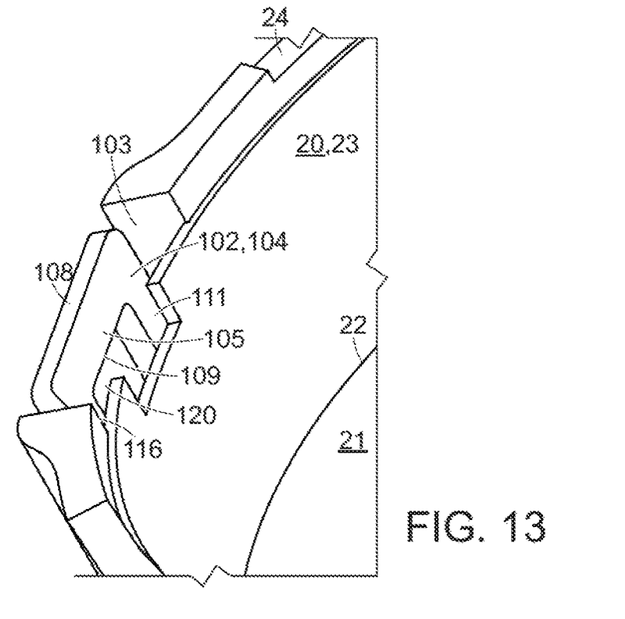
FIG. 13 is a side perspective view of a portion of the container of the gear housing as seen from inside the gear housing.
Figure 14:
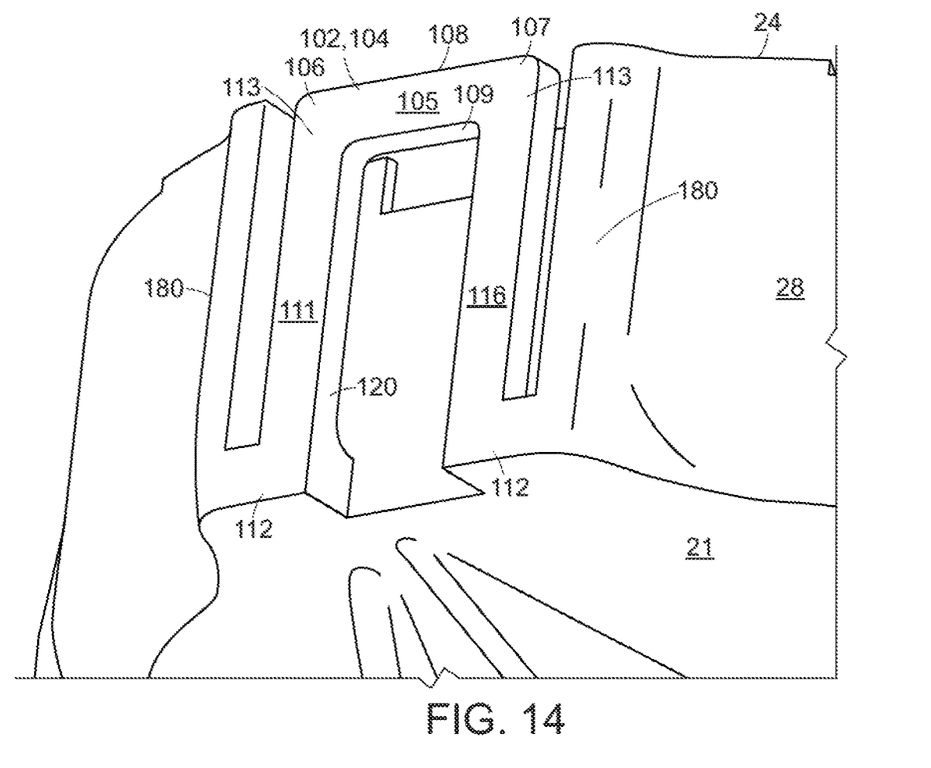
FIG. 14 is a side perspective view of a portion of the container of the gear housing as seen from outside the gear housing.

The clip 102 includes a U-shaped plate portion 104 that extends in parallel to the sidewall 23 such that a narrow insertion space 103 is provided between the plate portion 104 and the sidewall 23. The plate portion 104 includes a latch bar 105 and first and second legs 111, 116 that together provide the clip 102 with its U-shape.

The first and second legs 111, 116 each include a proximal end 112 that is formed integrally with the sidewall outer surface 28 at a location corresponding the container base 21. The first and second legs 111, 116 each include a distal end 113 that is opposed to the proximal end 112 and is axially spaced apart from the proximal end 112. In addition, the distal end 113 of each of the first and second legs 111, 116 is spaced apart from the sidewall outer surface a distance corresponding to the depth of the insertion space 103. The first and second legs 111, 116 extend axially and support the latch bar 105 in space.

The latch bar 105 extends in a direction that is perpendicular to the first and second legs 111, 116. The latch bar 105 has a first end 106 that is connected to the distal end 113 of the first leg 111. The latch bar 105 has a second end 107 that is opposed to the first end 106, and is connected to the distal end 113 of the second leg 116. In addition, the latch bar 105 includes an outer edge 108 that extends between the latch bar first end 106 and the latch bar second end 107 in a direction perpendicular to the rotational axis 12 and that faces the cover 40, and an inner edge 109 that is parallel to the outer edge 108 and faces the container base 21. The plate portion 104 is dimensioned so that the latch bar outer edge 108 is disposed no further from the base 21 than the sidewall free edge 24. That is, the height h3 of the plate portion 104 is less than or equal to the height h1 of the sidewall 23.

The clip 102 includes a clip opening 120 that corresponds to the space bounded by the latch bar 105, the first leg 111 and the second leg 116.

Figure 12:
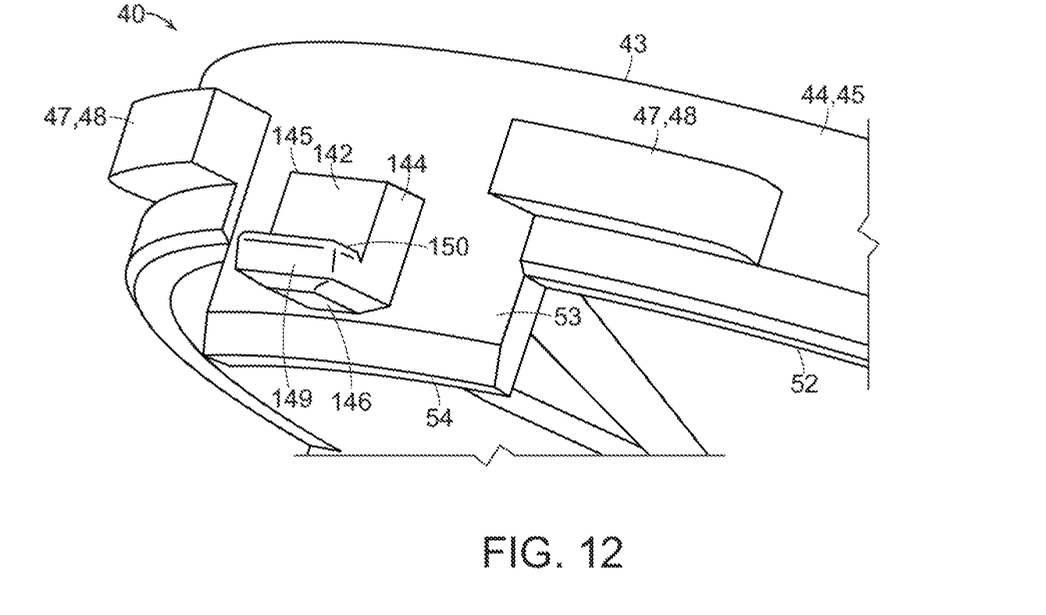
FIG. 12 is a side perspective view of a portion of the cover of the gear housing as seen from outside the gear housing.

The lug 142 includes a generally rectangular lug plate 144 that protrudes from the rim outward-facing surface 45 in a direction perpendicular to the rotational axis 12. In particular, the lug plate 144 is disposed on a rim extension tab 53. The lug plate 144 includes a first end 145 that is parallel to the rim free edge 52, a second end 146 opposed to the lug plate first end 145. The lug plate 144 is positioned on the rim 44 such that the lug plate first end 145 is axially positioned between the rim free edge 52 and the cover body 43 at a location close to the rim free edge 52. The lug plate second end 146 is disposed further from the cover body 43 than the lug plate first end 145. In particular, the lug plate second end 146 is disposed between the rim free edge 52 and a free edge 54 of the extension tab 53.

The lug 142 includes a ridge 149 that protrudes outward and extends along the lug plate second end 146. Thus, the ridge 149 is disposed further from the cover body 43 than the rim free edge 52. The ridge 149 provides a latch bar engagement edge 150 that is parallel to the rim free edge 54 and faces opposite to the rim free edge 54.

The peripheral snap-fit fastener 100 includes a bumper 180 disposed on each of opposed sides of the plate portion 104, whereby the plate portion 104 is disposed between a pair of bumpers 180 along a circumferential direction of the sidewall 23. Each bumper 180 protrudes outward from the sidewall outer surface 28 at least distance that corresponds to a distance of an outer surface 110 of the plate portion 104 from the sidewall outer surface 28. Each bumper 180 has an axial dimension that corresponds to an axial dimension of the plate portion 104. In addition, each bumper 180 is inclined along a circumferential direction of the sidewall 23 such that the distance that the bumper 180 protrudes outward from the sidewall outer surface 28 is a maximum adjacent to the plate portion 104 and less than the maximum at locations that are spaced apart from the plate portion 104. Since the bumpers 180 protrude outward from the sidewall 23, the clip 102 and lug 142 are disposed in the recess 182 defined between the pair of bumpers 180. The recess 182 serves to protect the clip 102 during handling and assembly, and to protect the peripheral snap-fit fastener 100 as a whole once the actuator housing 1 is assembled.

Figure 11:
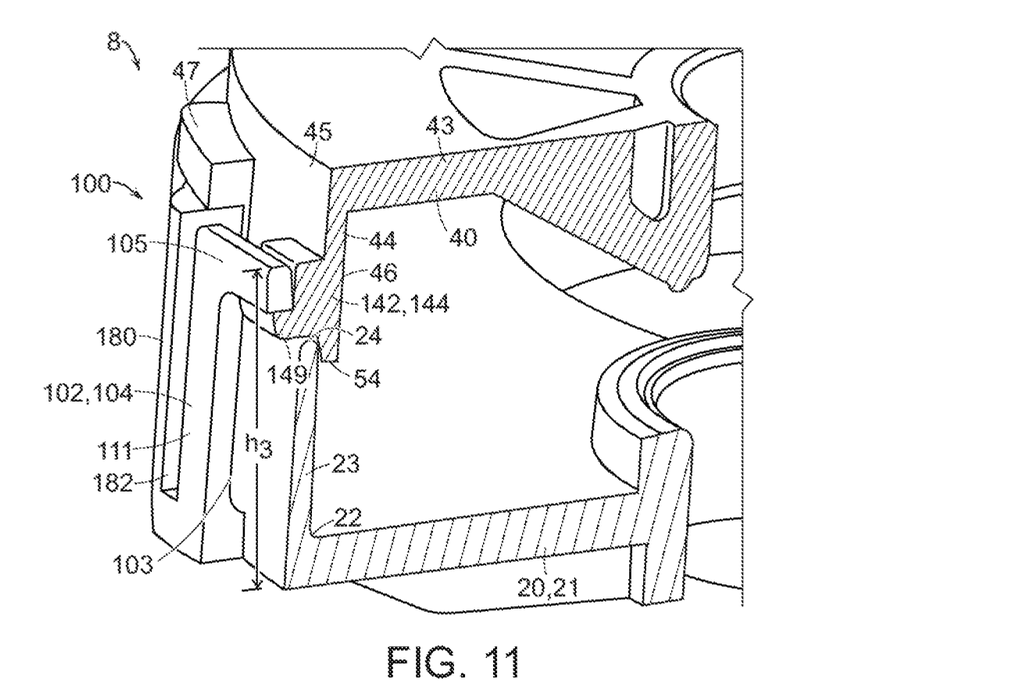
FIG. 11 is a perspective cross sectional view of a portion of the gear housing as seen along line 11-11 of FIG. 2.

When the clip 104 is assembled with the lug 142, a portion of the cover extension tab 53 extends into the container 20 and overlies an inner surface of the sidewall 33. In addition, the lug plate 144 extends into the insertion space 103 between the plate portion 104 and the sidewall outer surface 28, and the ridge 149 protrudes into the clip opening 120. In this configuration, the latch bar engagement edge 150 abuts the latch bar inner edge 109, whereby the cover 40 is retained on the container 20. As the cover extension tab 53 and lug 142 is inserted into the insertion space 103, the plate portion 104 deforms and the latch bar 105 is displaced outward to accommodate the passage of the lug plate 144 and ridge 149 between the latch bar 105 and the sidewall outer surface 28. When the ridge 149 has passed the latch bar and resides within the clip opening 120, the plate portion 104 elastically returns to its undisplaced configuration.

In the illustrated embodiment, the receptacle 61 of the central snap-fit fastener 60 is disposed in the hollow interior space of the gear shaft 25, and the retainer 80 of the central snap-fit fastener 60 protrudes from the cover inner surface 51. It is understood that in other embodiments, the retainer 80 may be disposed in the hollow interior space of the gear shaft 25, and the receptacle 61 may protrude from the cover inner surface 51.

Selective illustrative embodiments of the housing and fasteners are described above in some detail. It should be understood that only structures considered necessary for clarifying the housing and fasteners have been described herein. Other conventional structures, and those of ancillary and auxiliary components of the housing and fasteners, are assumed to be known and understood by those skilled in the art. Moreover, while a working example of the housing and fasteners have been described above, the housing and fasteners are not limited to the working examples described above, but various design alterations may be carried out without departing from the housing and fasteners as set forth in the claims.

We claim:

1. A fastener configured to connect a housing cover to an open end, of a housing container, the housing container including a base, a sidewall that surrounds a periphery of the base and a hollow shaft that extends perpendicularly from, and is fixed to, the base and is surrounded by the sidewall, the fastener comprising:
   a retainer that includes a post that protrudes from an inner surface of the housing cover and a latch portion disposed on a free end of the post, the latch portion having a diameter that is larger than a diameter of the free end of the post; and
   a receptacle disposed in the hollow shaft, the receptacle having a shape of a hollow, truncated cone, the receptacle including a receptacle first end that is fixed to an inner surface of the hollow shaft, a receptacle second end that is spaced apart from the receptacle first end, and slots that extend between the receptacle first end and the receptacle second end and separate the receptacle into elastic fingers,
wherein when the retainer is assembled with the receptacle, the post is disposed in the receptacle and extends through the receptacle second end so that the latch portion is disposed outside the receptacle and the retainer is retained in connection with the receptacle via engagement of the latch portion with the receptacle second end.

2. The fastener of claim 1, wherein the retainer forms a snap-fit connection to the receptacle.

3. The fastener of claim 1, wherein the diameter of the latch portion is greater than a diameter of the receptacle second end.

4. The fastener of claim 3 wherein the receptacle is configured to expand to an expanded configuration in order to allow passage of the latch portion through the receptacle second end during assembly of the housing cover with the housing container, and to elastically contract after the latch portion has passed through the receptacle second end.

5. The fastener of claim 1, wherein the post includes a fixed end that is fixed to the inner surface of the housing cover, and a diameter of the fixed end is greater than the diameter of the free end.

6. The fastener of claim 1, wherein the post includes a fixed end that is fixed to the inner surface of the housing cover, and the post includes grooves that extend from the fixed end to the free end.

7. The fastener of claim 6, wherein each of the grooves receives a respective one of the elastic fingers.

8. The fastener of claim 1, wherein the receptacle is disposed inside the hollow shaft such that the receptacle first end and the receptacle second end are surrounded by the hollow shaft.

9. A housing for enclosing a gear set that is configured to modify an output of a motor, the gear set including a gear that has an opening that is concentric with a rotational axis of the gear, the housing comprising:
   a hollow gear shaft that forms part of the housing and extends through the opening; and
   a cover that closes an open end of the housing,
wherein the cover is secured to the open end of the housing via a fastener that provides a mechanical connection between the cover and the hollow gear shaft.

10. The housing of claim 9, wherein the mechanical connection is achieved using a snap-fit fastener.

11. The housing of claim 9, wherein the fastener comprises:
   a retainer that includes a post that protrudes from an inner surface of the cover and a latch portion disposed on a free end of the post, the latch portion having a diameter that is larger than a diameter of the free end of the post; and
   a receptacle disposed in the hollow gear shaft, the receptacle having a shape of a truncated, hollow cone, the receptacle including a receptacle first end that is fixed to an inner surface of the hollow gear shaft, a receptacle second end that is spaced apart from the receptacle first end, and slots that extend between the receptacle first end and the receptacle second end and separate the receptacle into elastic fingers, wherein when the retainer is assembled with the receptacle, the post is disposed in the receptacle and extends through the receptacle second end so that the latch portion is disposed outside the receptacle and the retainer is retained in connection with the receptacle via engagement of the latch portion with the receptacle second end.

12. The housing of claim 11, wherein the retainer forms a snap-fit connection to the receptacle.

13. The housing of claim 12, wherein the diameter of the latch portion is greater than a diameter of the receptacle second end.

14. The housing of claim 11 wherein the diameter of the latch portion is greater than an inner diameter of the receptacle second end, and the receptacle is configured to expand to an expanded configuration in order to allow passage of the latch portion through the receptacle second end during assembly of the housing cover with the housing container, and to elastically contract after the latch portion has passed through the receptacle second end.

15. The housing of claim 11, wherein the post includes a fixed end that is fixed to the inner surface of the cover, and a diameter of the fixed end is greater than the diameter of the free end.

16. The housing of claim 11, wherein the post includes a fixed end that is fixed to the inner surface of the cover, and the post includes grooves that extend from the fixed end to the free end.

17. The housing of claim 16, wherein each of the grooves receives a respective one of the elastic fingers.

18. The housing of claim 11, wherein the receptacle is disposed inside the hollow gear shaft such that the receptacle first end and the receptacle second end are surrounded by the hollow gear shaft.

19. The housing of claim 11, wherein the retainer is disposed in a recess formed in the inner surface of the cover.

20. A housing for an electro-mechanical device, the housing comprising:

a container that receives and supports the electro-mechanical device, the container including a base and sidewall that protrudes from the base, a free edge of, the sidewall defining an open end of the container; and a cover that closes the open end of the container, wherein the cover is secured to the open end of the container via a mechanical connector that includes a receptacle and a retainer that forms a snap-fit engagement with the receptacle, and wherein the retainer is formed integrally with the cover and is recessed relative to a surface of the cover and the receptacle is formed integrally with the container and is recessed relative to a surface of the container, or the retainer is formed integrally with container and is recessed relative to the surface of the container and the receptacle is formed integrally with the cover and is recessed relative to the surface of the cover.

* * * * *

UNITED STATES PATENT AND TRADEMARK OFFICE
CERTIFICATE OF CORRECTION

PATENT NO. : 10,677,342 B2
APPLICATION NO. : 16/030302
DATED : June 9, 2020
INVENTOR(S) : Ramirez Ortiz et al.

Page 1 of 1

It is certified that error appears in the above-identified patent and that said Letters Patent is hereby corrected as shown below:

In the Claims

In Claim 1, at Column 9, Line 58: "open end, of a housing container," should read --open end of a housing container--.

In Claim 11, at Column 10, Lines 63-64: "a receptacle second, end" should read --a receptacle second end--.

In Claim 20, at Column 12, Lines 13-14: "a free edge of, the sidewall" should read --a free edge of the sidewall--.

Signed and Sealed this
Sixth Day of October, 2020

Andrei Iancu
*Director of the United States Patent and Trademark Office*